(12) United States Patent
Miyazaki et al.

(10) Patent No.: US 7,492,533 B2
(45) Date of Patent: *Feb. 17, 2009

(54) IMAGING LENS, IMAGING UNIT, AND OPTICAL DEVICE

(75) Inventors: Kyoichi Miyazaki, Osaka (JP); Tomoko Iiyama, Osaka (JP); Kazutake Boku, Osaka (JP)

(73) Assignee: Panasonic Corporation, Osaka (JP)

( * ) Notice: Subject to any disclaimer, the term of this patent is extended or adjusted under 35 U.S.C. 154(b) by 205 days.

This patent is subject to a terminal disclaimer.

(21) Appl. No.: 10/571,617

(22) PCT Filed: Sep. 10, 2004

(86) PCT No.: PCT/JP2004/013571

§ 371 (c)(1),
(2), (4) Date: Mar. 10, 2006

(87) PCT Pub. No.: WO2005/026807

PCT Pub. Date: Mar. 24, 2005

(65) Prior Publication Data

US 2007/0097520 A1    May 3, 2007

(30) Foreign Application Priority Data

Sep. 10, 2003    (JP) .............................. 2003-318013

(51) Int. Cl.
   *G02B 9/14*    (2006.01)
(52) U.S. Cl. ...................... 359/785; 359/739
(58) Field of Classification Search .......... 359/785–789
   See application file for complete search history.

(56) References Cited

U.S. PATENT DOCUMENTS 6,466,377 B1    10/2002    Saito et al.

(Continued)

FOREIGN PATENT DOCUMENTS

| JP | 62-116915 | 5/1987 |
| JP | 62-191813 | 8/1987 |

(Continued)

*Primary Examiner*—Jordan M. Schwartz
(74) *Attorney, Agent, or Firm*—McDermott Will & Emery LLP

(57) ABSTRACT

The object is to obtain an imaging lens system having an entire lens system downsized, being excellent in portability, and being compatible with a large number of pixels by which a favorable image quality is provided. Provided is an imaging lens system for forming an optical image of an object on a light receiving surface of a solid-state image sensor, comprising, in order from an object side, an aperture diaphragm (100), a first lens element (101) having a positive optical power and a convex surface on an image side, a second lens element (102) having a negative optical power and being a meniscus lens whose object side has a concave shape, and a third lens element (103) having a positive optical power and being a meniscus lens whose object side has a convex shape, in which the following conditional expressions are satisfied:

$1.9 < |fd/f2d| < 3.5$ $0.9 < |fd/f3d| < 2.0$ $-2.5 < (r_{201}+r_{202})/(r_{201}-r_{202}) < -1.4$ $-1.7 < (r_{301}+r_{302})/(r_{301}-r_{302}) < -1.0.$

9 Claims, 7 Drawing Sheets

U.S. PATENT DOCUMENTS

| | | | |
|---|---|---|---|
| 6,970,306 B2 * | 11/2005 | Matsuo | 359/716 |
| 7,035,023 B2 * | 4/2006 | Nanba et al. | 359/785 |
| 2003/0193605 A1 | 10/2003 | Yamaguchi | |
| 2004/0150893 A1 | 8/2004 | Shinohara | |
| 2004/0212901 A1 | 10/2004 | Nanba et al. | |
| 2007/0053078 A1 * | 3/2007 | Iiyama et al. | 359/754 |

FOREIGN PATENT DOCUMENTS

| | | |
|---|---|---|
| JP | 8-234097 | 9/1996 |
| JP | 2001-75006 | 3/2001 |
| JP | 2003-149547 | 5/2003 |
| JP | 2003-195158 | 7/2003 |
| JP | 2004-4566 | 1/2004 |
| JP | 2004-219807 | 8/2004 |
| JP | 2004-226487 | 8/2004 |
| JP | 2004-240063 | 8/2004 |
| JP | 2004-325713 | 11/2004 |

* cited by examiner

IMAGING LENS, IMAGING UNIT, AND OPTICAL DEVICE

This application is the U.S. National Phase under 35 U.S.C. § 371 of International Application No. PCT/JP2004/013571, filed Sep. 10, 2004, which in turn claims the benefit of Japanese Application No. 2003-318013, filed Sep. 10, 2003, the disclosures of which Applications are incorporated by reference herein in their entirety.

TECHNICAL FIELD

The present invention relates to an imaging lens system, a compact imaging unit using a solid-state image sensor such as a CCD or a CMOS, and an optical device such as a digital still camera or a compact camera used in a personal digital assistance.

BACKGROUND ART

Recently, as a digital still camera (hereinafter, referred to as a DSC) or the like have rapidly gained popularity, imaging lenses with high optical performance compatible with a large number of pixels equal to or more than five million pixels have been commercialized for use in an image input device recording a digital image. In addition, many mobile telephones or PDA terminals provided with a compact camera have been commercialized, and accepted in the marketplace. Among them, compact imaging units and imaging lenses compatible with a large number of pixels (two million to four million pixels) equivalent to that of a DSC are particularly gaining attention for use in, for example, compact cameras provided in mobile terminals or the like, in particular.

Conventional downsized imaging units and imaging lenses can be largely divided into two groups.

One is imaging lenses used mainly in mobile telephones for which downsizing and cost reduction are sought, PC (personal computer) cameras, PDAs, or the like, as disclosed in Japanese Laid-Open Patent Publication No. 2003-195158, for example. These are highly attractive in their sizes and costs and thereby commercialized in a large number, but not compatible with a large number of pixels, and, in many cases, they are only compatible with about one hundred thousand to three hundred fifty thousand pixels. A compact image sensor having an imaging quality of more than one million pixels is proposed, as disclosed in Japanese Laid-Open Patent Publication No. 2003-149547, for example. However, the number of lenses therein is as many as four or more, and a less expensive, compact type is sought for portability.

The other is in a field applied in endoscopes, surveillance cameras, or the like. The lenses achieve high optical performance and downsizing of some extent. However, the number of lenses therein is as many as six to nine to ensure the required performance, and portability and cost thereof do not allow a common use.

DISCLOSURE OF THE INVENTION

In the above imaging unit and the imaging lens, in order to achieve a favorable optical performance while adopting an inexpensive configuration and trying to downsize its entire lens system, the lens shape or the like need to be appropriately configured while keeping the number of lenses to a minimum.

Generally, in order to downsize, an optical power of lenses is increased. However, when the optical power of the lenses is increased, aberration occurred in each of the lenses becomes large, thereby causing a problem that favorable aberration compensation in the entire optical system is difficult.

The object of the present invention is to provide, by employing an imaging lens configured with three, as the minimum number, lenses, adopting an appropriate configuration for each of the lenses, and appropriately setting an optical path using a diaphragm, the imaging lens, an imaging unit, and an optical device for which downsizing is performed for an entirety thereof and a high optical performance is obtained.

In order to solve the above problem, the present invention provides an imaging lens system for forming an optical image of an object on a light receiving surface of a solid-state image sensor, comprising, in order from an object side: an aperture diaphragm; a first lens element which is a bi-aspherical lens having a positive optical power and a convex surface on an image side; a second lens element having a negative optical power and being a bi-aspherical meniscus lens having a concave shape on an object side; and a third lens element having a positive optical power and being a bi-aspherical meniscus lens having a convex shape on an object side, and satisfying following conditional expressions:

$$1.9 < |fd/f2d| < 3.5 \quad (1)$$

$$0.9 < |fd/f3d| < 2.0 \quad (2)$$

$$-2.5 < (r_{201}+r_{202})/(r_{201}-r_{202}) < -1.4 \quad (3)$$

$$-1.7 < (r_{301}+r_{302})/(r_{301}-r_{302}) < -1.0 \quad (4)$$

here, fd is a focal length of the entire lens system to d-line (mm), f2d is a focal length of the second lens element to the d-line (mm), f3d is a focal length of the third lens element to the d-line (mm), $r_{201}$ is a radius of curvature of an object side surface of the second lens element (mm), $r_{202}$ is a radius of curvature of an image side surface of the second lens element (mm), $r_{301}$ is a radius of curvature of an object side surface of the third lens element (mm), and $r_{302}$ is a radius of curvature of an image side surface of the third lens element (mm).

According to the present invention, it is possible to obtain an imaging lens, an imaging unit, and an optical device having an entire lens system downsized, being excellent in portability, and being compatible with a large number of pixels by which a favorable image quality is provided.

BEST MODE FOR CARRYING OUT THE INVENTION

Hereinafter, an embodiment of the present invention is described.

Figure 1:
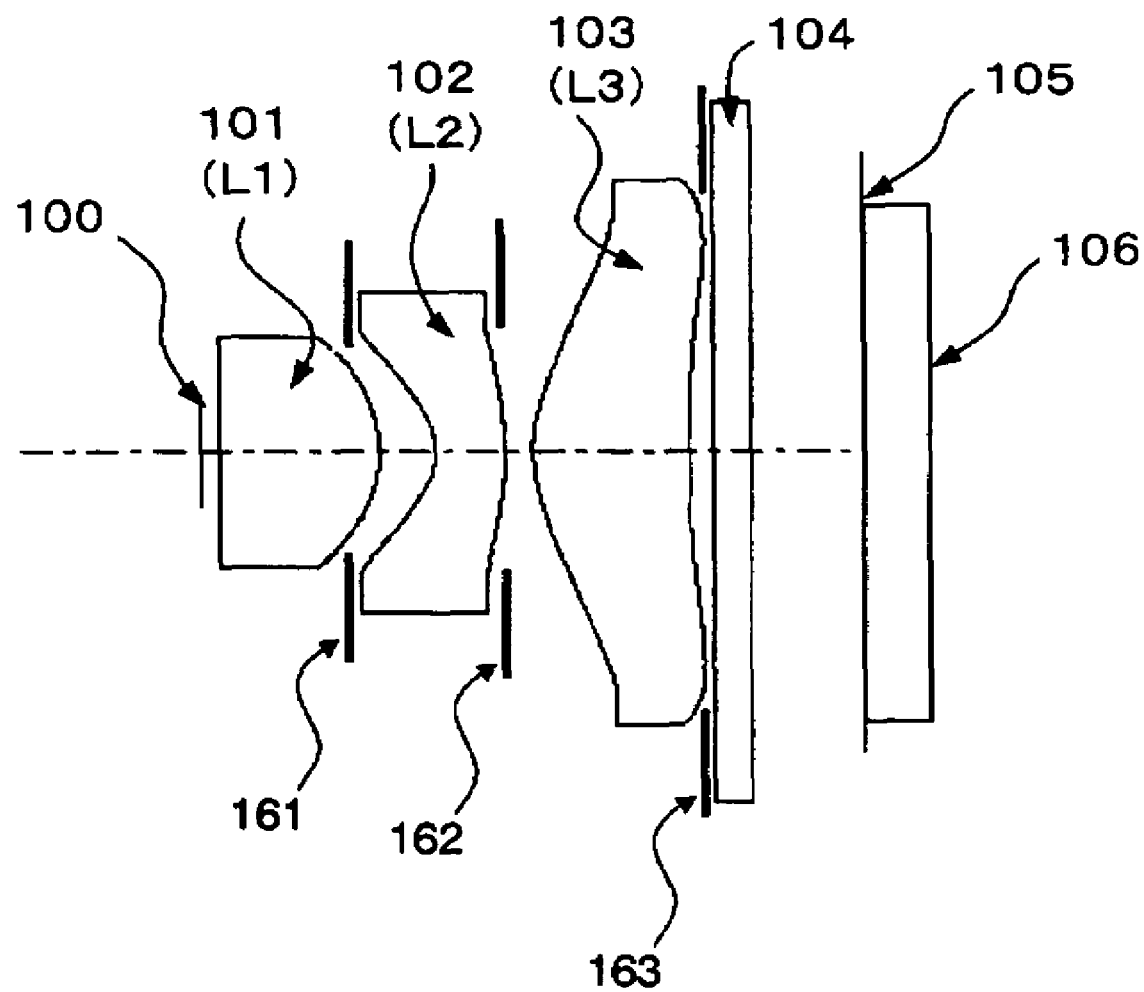
FIG. 1 is a schematic configuration diagram of an imaging unit according to an embodiment of the present invention.
Figure 2:
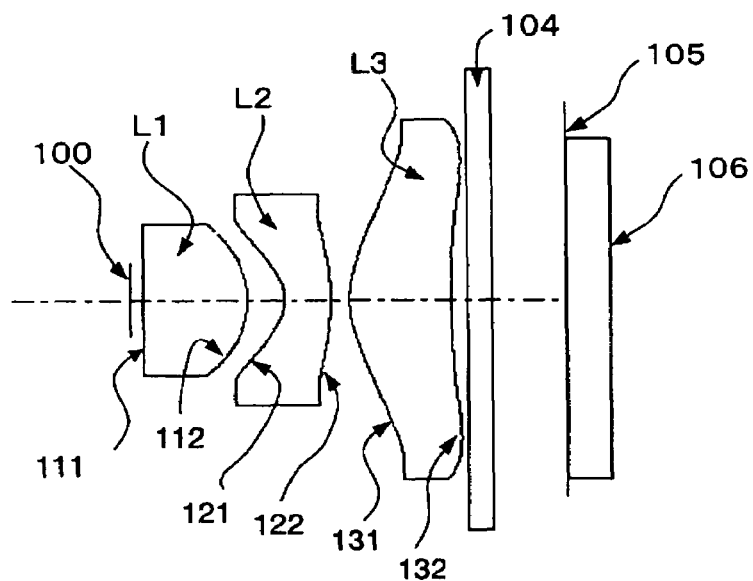
FIG. 2 is a schematic configuration diagram of an imaging lens according to Embodiment 1 of the present invention.
Figure 3:
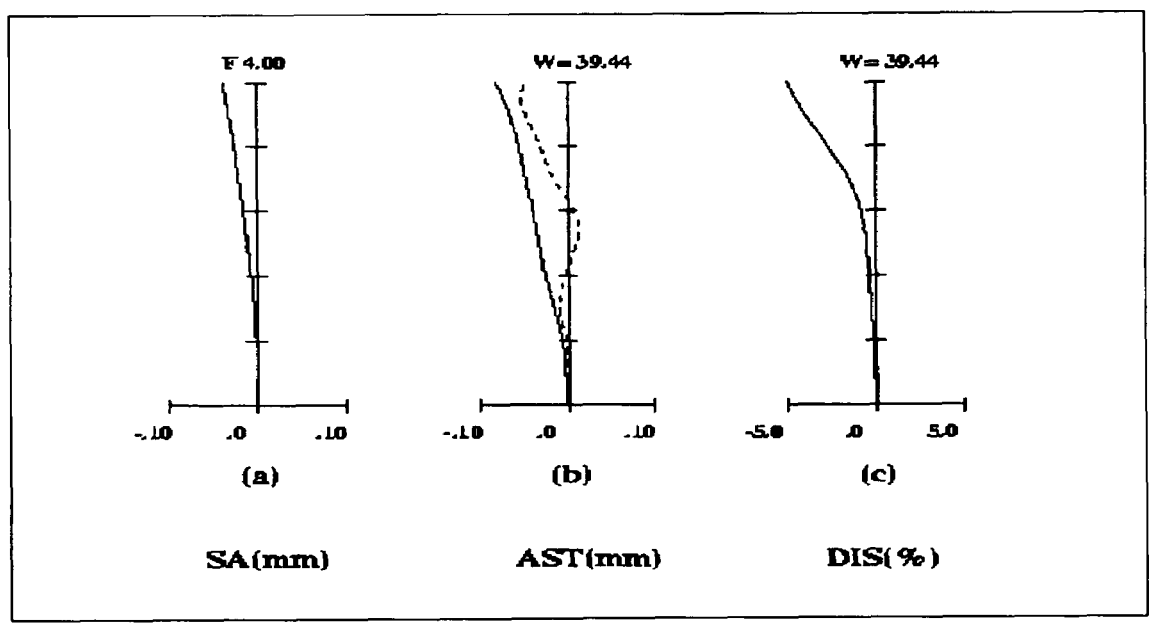
FIG. 3 is an aberration diagram according to the Embodiment 1 of the present invention.
Figure 4:
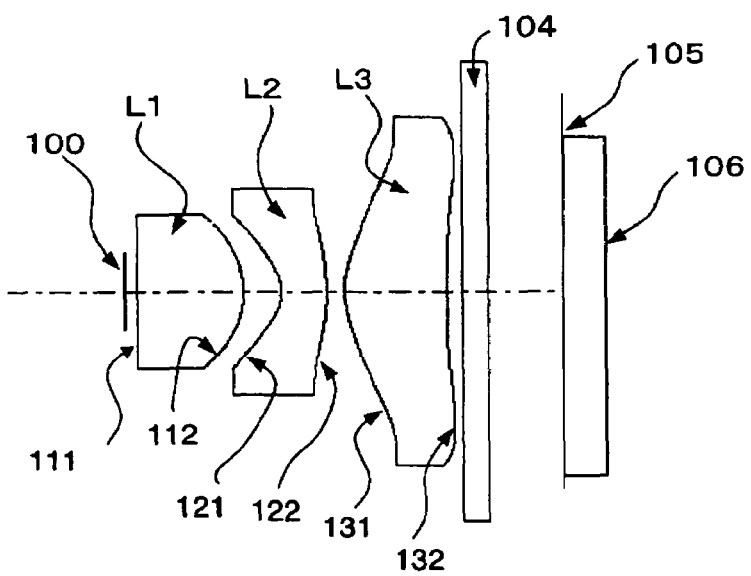
FIG. 4 is a schematic configuration diagram of an imaging lens according to Embodiment 2 of the present invention.
Figure 5:
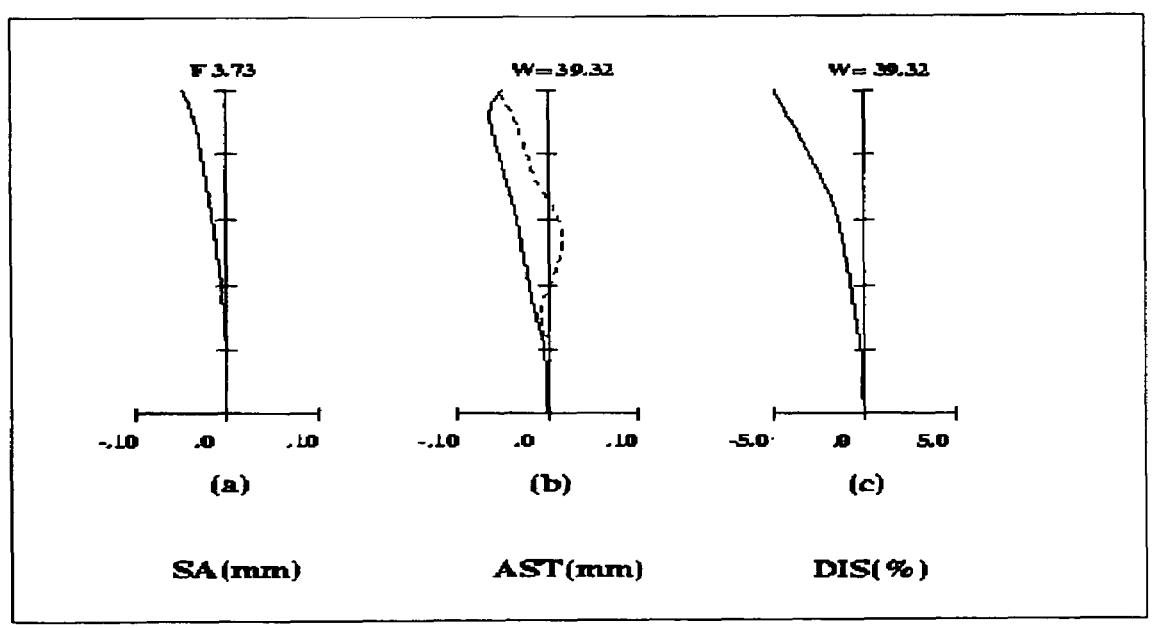
FIG. 5 is an aberration diagram according to the Embodiment 2 of the present invention.
Figure 6:
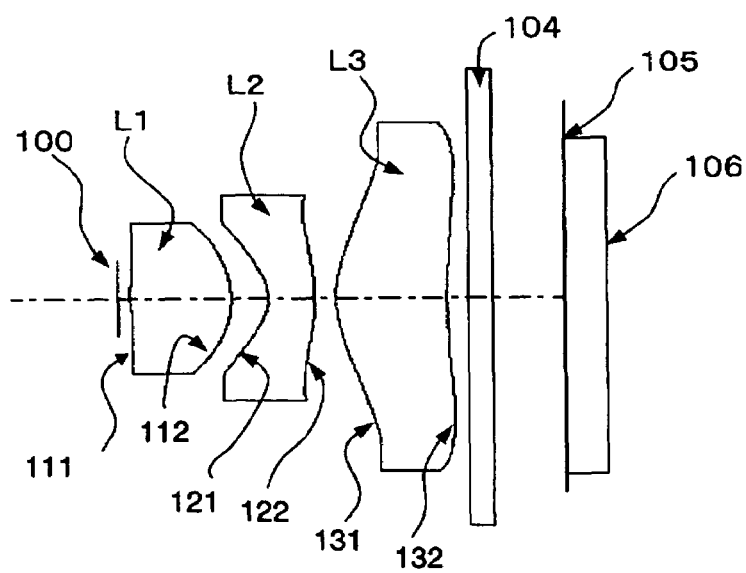
FIG. 6 is a schematic configuration diagram of an imaging lens according to Embodiment 3 of the present invention.
Figure 7:
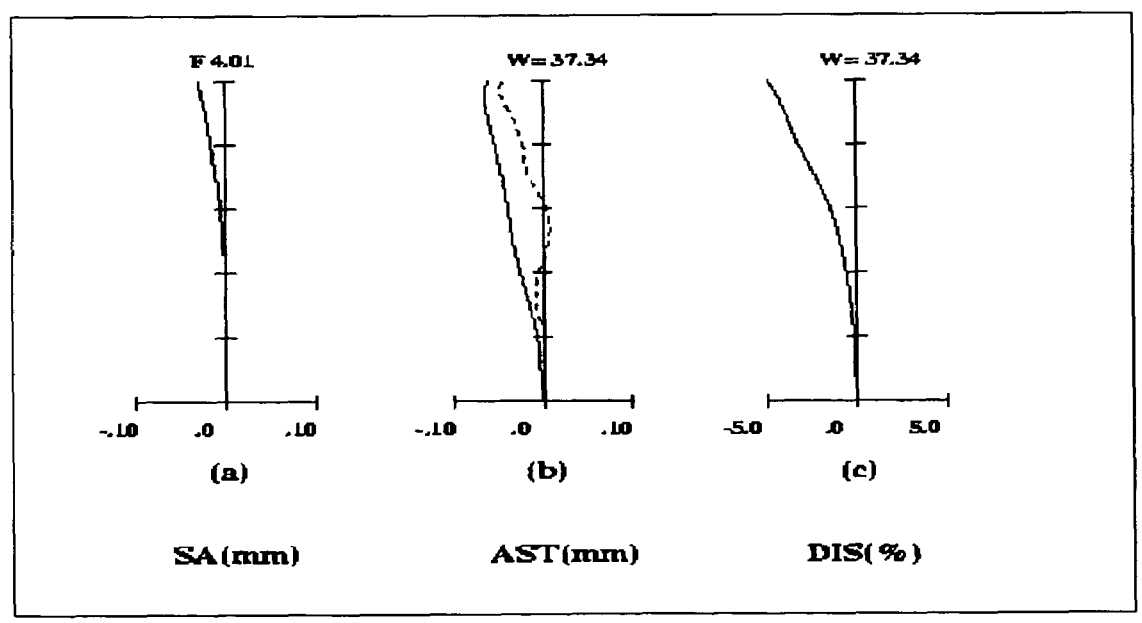
FIG. 7 is an aberration diagram according to the Embodiment 3 of the present invention.
Figure 8:
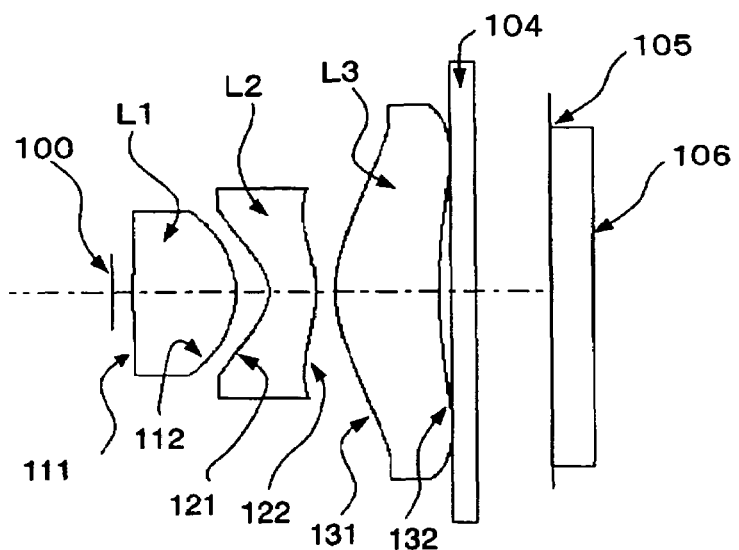
FIG. 8 is a schematic configuration diagram of an imaging lens according to Embodiment 4 of the present invention.
Figure 9:
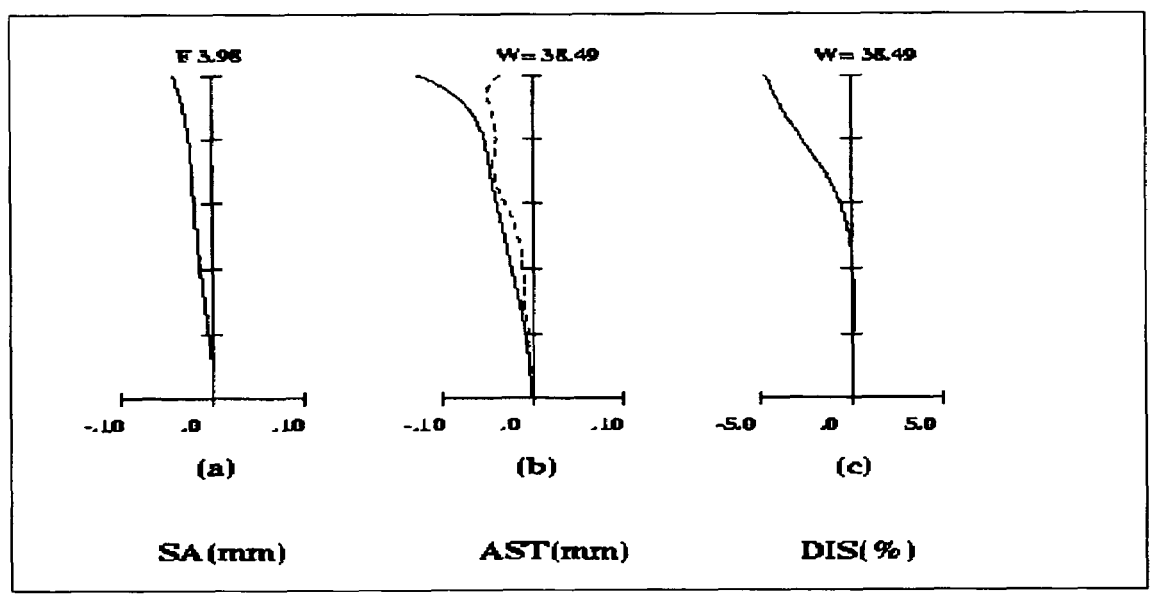
FIG. 9 is an aberration diagram according to the Embodiment 4 of the present invention.
Figure 10:
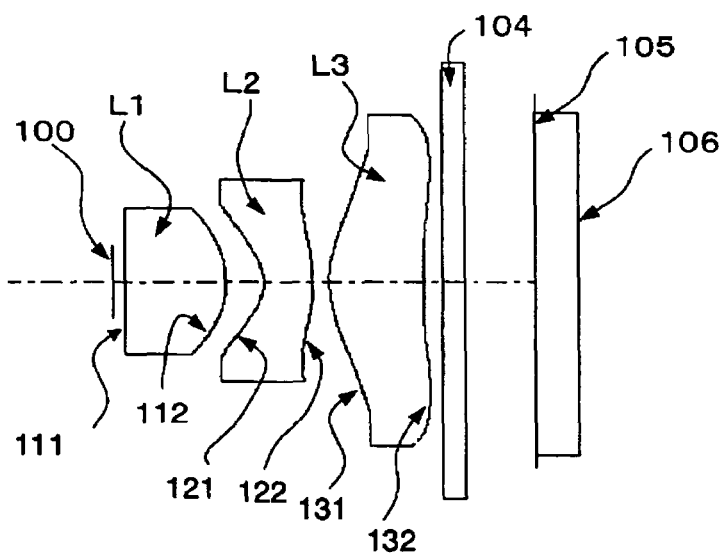
FIG. 10 is a schematic configuration diagram of an imaging lens according to Embodiment 5 of the present invention.
Figure 11:
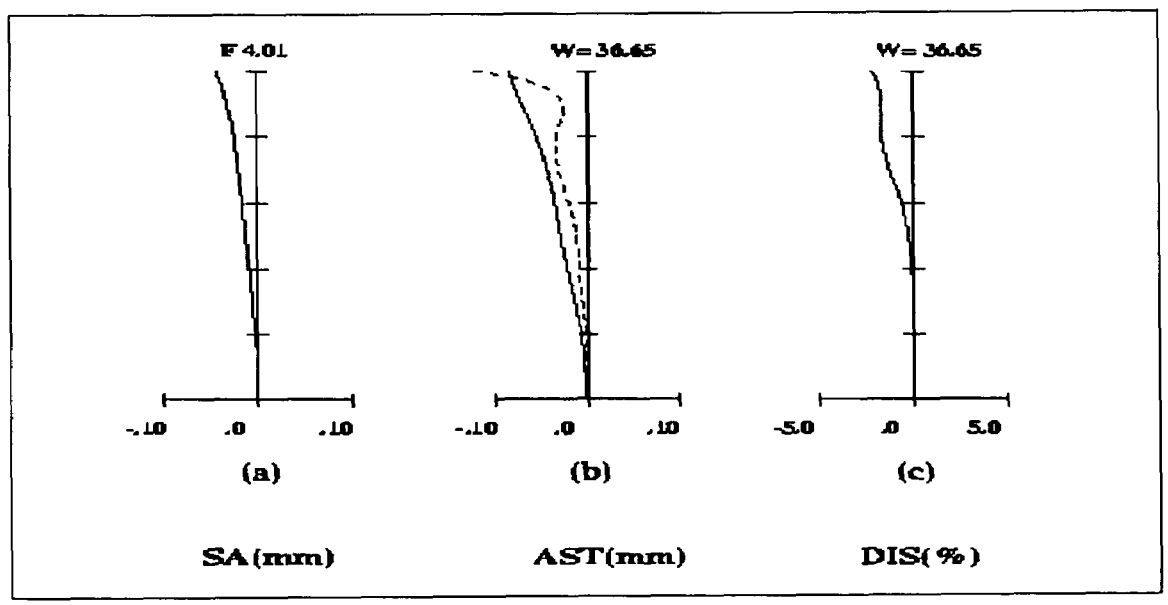
FIG. 11 is an aberration diagram according to the Embodiment 5 of the present invention.

FIG. 1 is a schematic configuration diagram of an imaging lens and an imaging unit according to the embodiment of the present invention. In the diagram, 100 denotes an aperture diaphragm, 101 denotes a first lens element (hereinafter, refers to as "L1") formed by a glass material, 102 denotes a second lens element (hereinafter, refers to as "L2") formed from a synthetic resin material, 103 denotes a third lens element (hereinafter, refers to as "L3") formed from a synthetic resin material, 104 denotes an optical low-pass filter (hereinafter, refers to as an "OLPF")), 105 denotes an image plane, 106 denotes a solid-state image sensor such as a CCD, 161 denotes a first optical cut member, 162 denotes a second optical cut member, and 163 denotes a third optical cut member.

In the above configuration, an imaging lens system includes the aperture diaphragm 100, the first lens element L1, the second lens element L2, and the third lens element L3, and an imaging unit includes the imaging lens system and the solid-state image sensor 106.

The first lens element L1 is a bi-convex lens having a positive optical power and bi-aspherical surfaces. The second lens element L2 has a negative optical power and is a bi-aspherical meniscus lens whose object side is concave. The third lens element L3 has a positive optical power and is a bi-aspherical meniscus lens whose object side is convex.

In order to perform downsizing of an imaging lens and an imaging unit, it is necessary to reduce a tolerance between an effective optical path diameter and a lens edge diameter, and therefore, there arises a concern that an adverse light due to an internal reflection on an edge reaches an image plane, thereby substantially reducing image quality. For this reason, the optical cut members 161, 162, and 163 having a flare reduction effect are respectively arranged between the first lens element L1 and the second lens element L2, the second lens element L2 and the third lens element L3, and the third lens element L3 and the image plane 105 so that light runs through well and a high image quality is achieved.

When the optical cut members 161, 162, and 163 have a function of being a spacer for locating a distance between each of the lenses, it becomes unnecessary to independently provide a spacer; therefore, a cost reduction can be resulted and it is thereby more preferable. Also, it is possible to black coat a periphery of the lens and use the lens as an optical cut member; accordingly, a reduction in cost and the number of components therein can be resulted and it is thereby preferable.

Next, by using numerical examples, the present invention is described in detail.

FIGS. 2, 4, 6, 8, and 10 are schematic configuration diagrams of an imaging lens according to Numerical examples 1 to 5 of the present invention, respectively. In each of the diagrams, 100 denotes the aperture diaphragm, L1 denotes the first lens element, L2 denotes the second lens element, L3 denotes the third lens element, 104 denotes the OLPF, 105 denotes the image plane, 111 denotes an object side surface of the first lens element L1, 112 denotes an image side surface of the first lens element L1, 121 denotes an object side surface of the second lens element L2, 122 denotes an image side surface of the second lens element L2, 131 denotes an object side surface of the third lens element L3, and 132 denotes an image side surface of the third lens element L3. Note that, in the Examples 1 to 5 also, as in the above embodiment according to FIG. 1, the first lens element L1 is formed by a glass material, and the second lens element L2 and the third lens element L3 are formed from a synthetic resin material.

In the present invention, in order to obtain a compact body and a favorable image quality, power of the second lens element L2 and the third lens element L3 need to be designed with appropriate values, and bending shape thereof also need to be designed with appropriate values. For this reason, it is preferable that the following conditional expressions are satisfied.

$$1.9 < |fd/f2d| < 3.5 \quad (1)$$

$$0.9 < |fd/f3d| < 2.0 \quad (2)$$

$$-2.5 < (r_{201} + r_{202})/(r_{201} - r_{202}) < -1.4 \quad (3)$$

$$-1.7 < (r_{301} + r_{302})/(r_{301} - r_{302}) < -1.0 \quad (4)$$

here, fd is a composite focal length of the entire lens system to d-line (mm), f2d is a focal length of the second lens element L2 to the d-line (mm), f3d is a focal length of the third lens element L3 to the d-line (mm), $r_{201}$ is a radius of curvature of the object side surface 121 of the second lens element L2 (mm), $r_{202}$ is a radius of curvature of the image side surface 122 of the second lens element L2 (mm), $r_{301}$ is a radius of curvature of the object side surface 131 of the third lens element L3 (mm), and $r_{302}$ is a radius of curvature of the image side surface 132 of the third lens element L3 (mm).

The above conditional expression (1) indicates the power of the second lens element L2 with respect to power of the entire lens system. In the conditional expression (1), when the lower limit thereof is exceeded, chromatic aberration is insufficiently compensated, causing difficulties in obtaining a favorable image quality. Also, when the upper limit thereof is exceeded, the amount of aberration occurrence in a single lens corresponding to the second lens element L2 becomes excessively large, causing difficulties in obtaining a favorable image quality in the entire lens system.

Also, the conditional expression (2) indicates the power of the third lens element L3 with respect to the power of the entire lens system. In the conditional expression (2), when the lower limit thereof is exceeded, a position of paraxial exit pupil for the entire lens system becomes close to an image side, whereby an incident angle of an off-axial principal ray onto the image plane cannot be reduced. When the upper limit thereof is exceeded, the amount of aberration occurrence in a single lens corresponding to the third lens element L3 becomes excessively large, and simultaneously, an outer diameter of the lens is large whereby a thickness of the lens on an optical axis becomes large, whereby downsizing cannot be achieved.

Also, the conditional expression (3) represents a shape factor indicating a bending shape of the second lens element L2. When the lower limit of the expression is exceeded, spherical aberration due to the object side surface 121 of the second lens element L2 occurs in a large amount, and, when the upper limit thereof is exceeded, astigmatism due to the image side surface 122 of the second lens element L2 occurs in a large amount, thereby causing difficulties in obtaining a favorable quality in either case.

Also, the conditional expression (4) represents a shape factor indicating a bending shape of the third lens element L3. When the lower limit of the expression is exceeded, spherical aberration due to the object side surface 131 of the third lens element L3 occurs in a large amount, and simultaneously, an off-axial image is curved to over-correction, and, when the upper limit thereof is exceeded, the off-axial image is curved to under-correction, thereby causing difficulties in obtaining a favorable quality in either case.

In consideration of lens manufacturing, more preferably, it is preferable that the tilt angle of a surface (θ32) in the neighborhood of the effective diameter of the image side surface 132 of the third lens element L3 satisfies the following conditional expression (13).

$$\theta 32 < 60 \text{ (unit: in degrees)} \tag{13}$$

When the (θ32) exceeds the upper limit of the conditional expression (13), not only precision for the shape of the aspherical surfaces is reduced, but also precision for shape measurement management is reduced, thereby causing difficulties in stably producing lenses. Also, although, in a paraxial region, the image side surface 122 of the second lens element L2 has a convex shape and a positive optical power, it is more preferable that the image side surface 122 of the second lens element L2 has a concave shape and a negative optical power in the neighborhood of the effective diameter, because there is a tendency that closer to the periphery of an aspherical surface, more reduced in power there is. As such, a luminous flux at a periphery portion is bent in a direction away from an optical axis, and thereby reducing the incident angle onto the image plane after bending at the third lens element L3.

Further, in the entire lens system, in order to achieve downsizing and a favorable image quality, an angle of view (2ωd) and an entire length of the lens system are required to be set to appropriate values. As for the angle of view, if it is set toward a telephoto side, the focal length needs to be set long, and thereby being not appropriate when requiring downsizing. On the other hand, if the angle of view is set toward a wide-angle side, aberration compensation has to be favorably performed at wide angle of view, and particularly, compensation for astigmatism or distortion is difficult.

In the present invention, in order to achieve downsizing for the entire lens system in an entire lengthwise, it is preferable that the following conditional expressions are satisfied.

$$70 < 2\omega d < 85 \tag{5}$$

$$1.4 < T/fd < 2.0 \tag{6}$$

here,

ωd is a half view angle of the entire lens system to the d-line (unit: in degrees), and T is an entire length between the object side surface 111 of the first lens element L1 and the image plane (mm).

In the above conditional expression (5), compared to a usual standard angle of view (about 35 mm using a 135 film camera), setting is performed on a wide-angle side.

In a case of downsizing the entire length of the entire lens system, the most favorable image quality is obtained by satisfying the above condition. When the lower limit in the above condition is exceeded, the angle of view becomes narrow and the focal length becomes long thereby lengthening the entire length. Therefore, downsizing cannot be achieved. When the upper limit thereof is exceeded, the angle of view becomes excessively wide. Therefore, astigmatism and distortion are difficult to be compensated.

The conditional expression (6) is an expression indicating the ratio between the entire length of the above lens system and the focal length of the entire lens system. In order to achieve downsizing and a favorable image quality, this conditional expression needs to be satisfied. When the lower limit of the condition is exceeded, aberration on each of the lens surfaces occurs in a large amount, and therefore, a favorable image quality as a whole cannot be obtained. When the upper limit thereof is exceeded, downsizing cannot be achieved, thereby resulting in a less attractive imaging lens.

In the imaging lens system of each of the embodiments, in order to obtain a compact body and a favorable image quality, the power of the first lens element L1 needs to be designed with an appropriate value, and the bending shape also needs to be designed with an appropriate value. Therefore, it is preferable that the following conditional expressions are satisfied.

$$1.8 < |fd/f1d| < 2.2 \tag{7}$$

$$0.5 < (r_{101} + r_{102})/(r_{101} - r_{102}) < 1.0 \tag{8}$$

here, f1d is a focal length of the first lens element L1 to the d-line (mm), $r_{101}$ is a radius of curvature of the object side surface 111 of the first lens element L1 (mm), and $r_{102}$ is a radius of curvature of the image side surface 112 of the first lens element L1 (mm).

The above conditional expression (7) indicates the power of the first lens element L1 with respect to the power of the entire lens system. In this condition, when the lower limit is exceeded, a position of principal points for the entire lens system becomes excessively close to the image side, causing difficulties in downsizing and in obtaining a favorable image quality. Also, when the upper limit thereof is exceeded, the amount of aberration occurrence in a single lens corresponding to the first lens element L1 becomes excessively large, causing difficulties in obtaining a favorable image quality as a whole, and simultaneously, the tilt angle of a surface in the neighborhood of the effective diameter of the image side surface 112 of the first lens element L1 becomes excessively large, causing difficulties in manufacturing thereof.

Also, the above conditional expression (8) represents a shape factor indicating a bending shape of the first lens element L1. In this condition, when the lower limit is exceeded, coma aberration occurs in a large amount, and, when the upper limit thereof is exceeded, spherical aberration due to the image side surface 112 of the first lens element L1 occurs in a large amount, thereby causing difficulties in obtaining a favorable quality in either case.

More preferably, in consideration of lens manufacturing, it is preferable that a tilt angle of a surface (θ12) in the neighborhood of the effective diameter of the image side surface 112 of the first lens element L1 satisfies the following conditional expression.

$$\theta 12 < 50 \text{ (unit: in degrees)} \qquad (14)$$

In the above conditional expression (14), when the ($\theta 12$) exceeds the upper limit, not only precision for the shape of the aspherical surfaces is reduced, but also precision for shape measurement management is reduced, thereby causing difficulties in stably producing lenses.

Also, the present invention features obtaining a favorable image quality at wide angle of view. Accordingly, it is necessary to appropriately set power and shapes of the second lens element L2 and the third lens element L3. In the power setting for the second lens element L2 particularly, the power setting for the object side surface 121 thereof is especially required for the purpose of increasing the power of the lens and reducing the amount of aberration occurrence. For this reason, it is preferable that the following conditional expression is satisfied.

$$3.3 < |f d \times (Nd2-1)/r_{201}| < 4.5 \qquad (9)$$

here,

Nd2 is a refractive index of the second lens element L2 to the d-line.

The above conditional expression (9) represents power of the object side surface 121 of the second lens element L2 with respect to the power of the entire lens system. In this condition, both when the lower limit is exceeded and when the upper limit is exceeded, coma aberration and astigmatism occurring on the object side surface 121 and the image side surface 122 of the second lens element L2 cannot be appropriately eliminated, thereby causing difficulties in obtaining a favorable image quality.

Also, in the second lens element L2 and the third lens element L3, in order for chromatic aberration and a curvature of field, as a whole, to be compensated in a favorably balanced manner, it is preferable that each of Abbe numbers therefor satisfies the following conditional expressions.

$$25 < V2d < 35 \qquad (10)$$

$$50 < V3d < 60 \qquad (11)$$

The Abbe number refers to a value calculated from refractive indices to d-line (587.56 nm), F-line (486.13 nm), and C-line (656.27 nm), and is represented by the following expression.

$$Vd = \frac{(Nd-1)}{(Nf-Nc)}$$

Here, Nd, Nf, Nc are refractive indices to d-line, F-line, and C-line, respectively.

The above conditional expressions (10) and (11) respectively designate the Abbe numbers of a material for the second lens element L2 and the third lens element L3. When the lower limit of the conditional expression (10) is exceeded, chromatic aberration is favorably compensated, but a Petzval sum for the entire lens system becomes excessively large and the curvature of field becomes large. When the upper limit thereof is exceeded, the chromatic aberration is insufficiently compensated, and simultaneously, the power of each lens is required to be more increased and aberration occurring in a single lens becomes excessively large. In either case, a favorable image quality is difficult to obtain. On the other hand, when the lower limit of the conditional expression (11) is exceeded, chromatic aberration of magnification, in particular, occurs in a large amount, and, when the upper limit thereof is exceeded, the chromatic aberration of magnification is excessively compensated, and simultaneously, the Petzval sum for the entire lens system becomes large whereby the curvature of field becomes large. In either case, a favorable image quality is difficult to obtain.

Also, it is preferable that the first lens element L1 satisfies the following conditional expression (12) in order for the chromatic aberration as a whole to be favorably compensated.

$$50 < V1d < 65 \qquad (12)$$

The above conditional expression (12) designates an Abbe number of a material for the first lens element L1. When the lower limit of the conditional expression (12) is exceeded, axial chromatic aberration is insufficiently compensated, and, when the upper limit thereof is exceeded, chromatic aberration can be favorably compensated, but the Petzval sum becomes large whereby the curvature of field becomes large, causing difficulties in obtaining a favorable image quality in either case.

The aperture diaphragm 100 is positioned on a side closest to an object, and therefore, the incident angle of the off-axial principal ray onto the image plane 105 can be reduced, and shading causing an illuminance reduction is effectively reduced. Also, in order to achieve downsizing for the lens system, it is preferable that the incident angle is maintained in a reasonable range, and therefore, it is desired to set an appropriate value to the incident angle of the off-axial principal ray. Therefore, more preferably, it is preferable that the maximum incident angle of the off-axial principal ray onto the image plane 105 ($\theta$max) satisfies the following conditional expression.

$$14 < \theta\text{max} < 19 \text{ (unit: in degrees)} \qquad (15)$$

In the above conditional expression (15), when the $\theta$max exceeds the lower limit thereof, the entire lens system cannot be downsized, and, when the $\theta$max exceeds the upper limit thereof, shading becomes large, thereby substantially reducing ambient illuminance.

The OLPF 104 is constructed with a material having birefringent characteristics, such as a crystal. The solid-state image sensor (not shown) such as a CCD takes a subject image, formed by the imaging lens, as a two dimensional sampling image having a low numerical aperture. Therefore, high frequencies equal to or more than half of sampling frequency become false signals. In order to eliminate such high frequency components of an image in advance, it is preferable that the OLPF 104 is positioned between the third lens element L3 and the image plane.

Also, more preferably, because the solid-state image sensor is generally highly sensitive to light in the infrared region, in order to have natural color reproduction, the OLPF 104 is preferably provided with an IR cut function for filtering out the light in the infrared region, by providing an IR absorbing material or coating.

Hereinafter, the Numerical examples 1 to 5 are shown.

The shape of an aspherical surface is represented by the following expression.

$$Z = \frac{(1/CR) \cdot H^2}{1 + \sqrt{1 - (1+K) \cdot (1/CR)^2 \cdot H^2}} + \sum_{n=4}^{16} An \cdot H^n$$

In a cylindrical coordinate system including: a Z axis referring to an axis extending toward an image plane side along an optical axis direction; and an H axis referring to an axis vertically extending along a direction away from the optical axis, CR is a paraxial radius of curvature (mm), K is a conic coefficient, and An is an n-th order aspherical coefficient.

Numerical example 1

| Surface number | Radius of curvature CR | Distance T | Refractive index Nd | Abbe number Vd |
|---|---|---|---|---|
| 1 | NF | 0.210 | | |
| 2 | 12.351 | 1.800 | 1.60602 | 57.5 |
| 3 | −1.432 | 0.639 | | |
| 4 | −0.683 | 0.779 | 1.58387 | 30.9 |
| 5 | −3.527 | 0.312 | | |
| 6 | 1.585 | 1.769 | 1.52996 | 55.8 |
| 7 | 32.417 | 0.266 | | |
| 8 | NF | 0.430 | 1.51680 | 64.2 |
| 9 | NF | | | |

Aspherical coefficient

| Surface number | K | A4 | A6 | A8 |
|---|---|---|---|---|
| 2 | −2.36959E−03 | −3.38666E−02 | −1.83549E−02 | −2.57210E−02 |
| 3 | −2.44108E+00 | −6.75157E−02 | 2.65421E−03 | −1.17415E−03 |
| 4 | −2.10665E+00 | −8.78791E−02 | 7.81002E−02 | −1.01505E−02 |
| 5 | 1.46036E+00 | 6.98003E−03 | 1.77807E−02 | −6.15774E−03 |
| 6 | −5.60322E+00 | 3.03792E−03 | −5.72973E−05 | −2.16299E−04 |
| 7 | −2.71162E+00 | 1.08781E−02 | −9.23298E−04 | −2.56446E−04 |

| Surface number | A10 | A12 | A14 | A16 |
|---|---|---|---|---|
| 2 | −2.51482E−02 | 1.11289E−01 | −3.39533E−02 | 1.21157E−12 |
| 3 | 2.83532E−03 | 1.50433E−03 | −5.42083E−03 | 2.20023E−03 |
| 4 | −1.21254E−02 | 3.23267E−03 | 7.44917E−04 | −8.50687E−05 |
| 5 | 2.40799E−03 | −7.91277E−04 | 1.39482E−04 | −8.74010E−06 |
| 6 | 4.90008E−05 | −7.39175E−06 | 8.26182E−07 | −4.70168E−08 |
| 7 | 2.61852E−05 | 2.53857E−06 | −4.66403E−07 | 1.61601E−08 |

Numerical example 2

| Surface number | Radius of curvature CR | Distance T | Refractive index Nd | Abbe number Vd |
|---|---|---|---|---|
| 1 | NF | 0.207 | | |
| 2 | 12.373 | 1.800 | 1.60602 | 57.5 |
| 3 | −1.437 | 0.643 | | |
| 4 | −0.674 | 0.770 | 1.58387 | 30.9 |
| 5 | −3.459 | 0.306 | | |
| 6 | 1.541 | 1.745 | 1.52996 | 55.8 |
| 7 | 21.586 | 0.299 | | |
| 8 | NF | 0.430 | 1.51680 | 64.2 |
| 9 | NF | | | |

Aspherical coefficient

| Surface number | K | A4 | A6 | A8 |
|---|---|---|---|---|
| 2 | −4.96683E−04 | −3.42462E−02 | −1.43893E−02 | −3.48887E−02 |
| 3 | −2.57072E+00 | −7.00157E−02 | 1.84595E−03 | −4.83287E−04 |
| 4 | −2.15357E+00 | −8.99632E−02 | 7.50236E−02 | −9.50292E−03 |
| 5 | 1.78618E+00 | 9.27105E−03 | 1.78798E−02 | −6.24062E−03 |
| 6 | −5.56052E+00 | 8.24845E−04 | 3.76947E−04 | −2.59477E−04 |
| 7 | −8.42910E−01 | 5.83381E−03 | −3.84183E−04 | −2.33337E−04 |

| Surface number | A10 | A12 | A14 | A16 |
|---|---|---|---|---|
| 2 | −1.61063E−02 | 1.11289E−01 | −3.39533E−02 | 1.12977E−12 |
| 3 | 3.10543E−03 | 1.51996E−03 | −5.54821E−03 | 2.22142E−03 |
| 4 | −1.07951E−02 | 3.14775E−03 | 4.07341E−04 | −1.75078E−05 |
| 5 | 2.43683E−03 | −7.77077E−04 | 1.36466E−04 | −8.08688E−06 |
| 6 | 5.14157E−05 | −7.31308E−06 | 7.46968E−07 | −4.41440E−08 |
| 7 | 2.29914E−05 | 2.20025E−06 | −4.75708E−07 | 1.91297E−08 |

Numerical example 3

| Surface number | Radius of curvature CR | Distance T | Refractive index Nd | Abbe number Vd |
|---|---|---|---|---|
| 1 | NF | 0.235 | | |
| 2 | 10.727 | 1.700 | 1.60602 | 57.5 |
| 3 | −1.570 | 0.641 | | |
| 4 | −0.756 | 0.794 | 1.58387 | 30.9 |
| 5 | −3.581 | 0.364 | | |
| 6 | 1.759 | 1.935 | 1.52996 | 55.8 |
| 7 | 14.859 | 0.359 | | |
| 8 | NF | 0.430 | 1.51680 | 64.2 |
| 9 | NF | | | |

Aspherical coefficient

| Surface number | K | A4 | A6 | A8 |
|---|---|---|---|---|
| 2 | 2.86792E−03 | −3.52246E−02 | −1.24496E−02 | −6.87444E−03 |
| 3 | −2.49507E+00 | −6.60667E−02 | 9.52764E−04 | −8.72993E−05 |
| 4 | −2.08279E+00 | −6.55574E−02 | 5.74675E−02 | −1.86176E−03 |
| 5 | 1.30638E+00 | 1.24479E−02 | 1.77302E−02 | −6.36342E−03 |
| 6 | −5.81845E+00 | 1.48733E−03 | −1.08746E−03 | 1.14998E−04 |
| 7 | −9.56767E−01 | 4.20934E−03 | −1.50988E−03 | −2.98521E−05 |

| Surface number | A10 | A12 | A14 | A16 |
|---|---|---|---|---|
| 2 | −6.60083E−02 | 1.11289E−01 | −3.39533E−02 | 6.03688E−13 |
| 3 | 2.86111E−03 | 7.11832E−04 | −4.70900E−03 | 1.97912E−03 |
| 4 | −9.23658E−03 | −1.04004E−03 | 2.13263E−03 | −1.95855E−04 |
| 5 | 2.28078E−03 | −6.50584E−04 | 7.75198E−05 | 3.13523E−07 |
| 6 | 1.81048E−05 | −7.98147E−06 | 1.16879E−06 | −7.63650E−08 |
| 7 | 1.92369E−05 | 1.20506E−06 | −4.32989E−07 | 1.97213E−08 |

Numerical example 4

| Surface number | Radius of curvature CR | Distance T | Refractive index Nd | Abbe number Vd |
|---|---|---|---|---|
| 1 | NF | 0.350 | | |
| 2 | 6.839 | 1.749 | 1.60602 | 57.5 |
| 3 | −1.538 | 0.566 | | |
| 4 | −0.662 | 0.794 | 1.58387 | 30.9 |
| 5 | −2.124 | 0.328 | | |
| 6 | 2.006 | 1.787 | 1.52996 | 55.8 |
| 7 | 9.732 | 0.208 | | |

-continued

Numerical example 4

| | | | | |
|---|---|---|---|---|
| 8 | NF | 0.430 | 1.51680 | 64.2 |
| 9 | NF | | | |

Aspherical coefficient

| Surface number | K | A4 | A6 | A8 |
|---|---|---|---|---|
| 2 | 5.56773E−02 | −2.19819E−02 | −6.79479E−02 | 1.62208E−01 |
| 3 | −1.26257E+00 | −2.80981E−02 | −5.90200E−03 | 1.57998E−03 |
| 4 | −1.66711E+00 | 4.30688E−02 | −3.39929E−03 | −4.43931E−04 |
| 5 | −6.43418E−03 | 9.43691E−02 | −9.36202E−03 | 2.00446E−03 |
| 6 | −5.16244E+00 | 2.14145E−03 | −5.41297E−04 | −9.22923E−06 |
| 7 | 5.16759E+00 | 4.73797E−03 | −1.88695E−03 | 4.00263E−05 |

| Surface number | A10 | A12 | A14 | A16 |
|---|---|---|---|---|
| 2 | −2.73896E−01 | 2.03177E−01 | −5.38484E−02 | 0.00000E+00 |
| 3 | 6.73246E−05 | −3.44139E−04 | −1.27626E−04 | 0.00000E+00 |
| 4 | 9.35687E−04 | 8.94481E−05 | −1.78178E−04 | 0.00000E+00 |
| 5 | −1.33613E−04 | −9.99438E−06 | 4.56178E−06 | 0.00000E+00 |
| 6 | 4.23486E−06 | 8.20407E−07 | −1.13111E−07 | 0.00000E+00 |
| 7 | 8.89617E−06 | −1.90183E−07 | −3.85875E−08 | 0.00000E+00 |

Numerical example 5

| Surface number | Radius of curvature CR | Distance T | Refractive index Nd | Abbe number Vd |
|---|---|---|---|---|
| 1 | NF | 0.211 | | |
| 2 | 9.201 | 1.800 | 1.60602 | 57.5 |
| 3 | −1.624 | 0.686 | | |

-continued

Numerical example 5

| | | | | |
|---|---|---|---|---|
| 4 | −0.745 | 0.892 | 1.58387 | 30.9 |
| 5 | −3.098 | 0.301 | | |
| 6 | 1.799 | 1.698 | 1.52996 | 55.8 |
| 7 | 10.830 | 0.339 | | |
| 8 | NF | 0.430 | 1.51680 | 64.2 |
| 9 | NF | | | |

Aspherical coefficient

| Surface number | K | A4 | A6 | A8 |
|---|---|---|---|---|
| 2 | 9.92228E−04 | −2.58209E−02 | −3.64022E−02 | 5.99987E−02 |
| 3 | −2.96115E+00 | −7.01546E−02 | 1.02076E−02 | 2.25996E−03 |
| 4 | −2.02686E+00 | −4.55466E−02 | 6.89685E−02 | −2.32075E−02 |
| 5 | 1.42944E+00 | 2.33348E−02 | 1.84202E−02 | −6.25435E−03 |
| 6 | −5.65213E+00 | 7.86511E−05 | −6.32509E−04 | −1.42440E−04 |
| 7 | −1.29464E+00 | 3.30267E−03 | −2.27061E−03 | 3.80197E−05 |

| Surface number | A10 | A12 | A14 | A16 |
|---|---|---|---|---|
| 2 | −1.09947E−01 | 1.11289E−01 | −3.39533E−02 | 2.38369E−12 |
| 3 | −4.40969E−03 | 4.66236E−04 | 8.72483E−04 | −2.72869E−04 |
| 4 | −7.82533E−03 | 8.16419E−03 | −1.53812E−03 | −9.41551E−05 |
| 5 | 2.35111E−03 | −8.41006E−04 | 1.78974E−04 | −1.32042E−05 |
| 6 | 7.34247E−05 | −8.07701E−06 | 3.69862E−08 | 1.10837E−08 |
| 7 | 3.07676E−05 | 8.99954E−07 | −6.90677E−07 | 3.61999E−08 |

FIGS. 3, 5, 7, 9, and 11 are aberration diagrams corresponding to the Numerical examples 1 to 5.

In these aberration diagrams, (a) is a graph showing spherical aberration (SA), (b) is a graph showing astigmatism (AST), and (c) is a graph showing distortion (DIS).

Table 6 shows values for the above numerical examples and numerical values for the conditional expressions.

Table 6 for numerical values of conditional expressions

| | | Example 1 | Example 2 | Example 3 | Example 4 | Example 5 |
|---|---|---|---|---|---|---|
| | fd | 4.24 | 4.26 | 4.57 | 4.37 | 4.55 |
| | f1d | 2.22 | 2.23 | 2.38 | 2.24 | 2.42 |
| | f2d | −1.60 | −1.59 | −1.82 | −2.05 | −1.94 |
| | f3d | 3.07 | 3.03 | 3.57 | 4.40 | 3.80 |
| | T | 7.24 | 7.24 | 7.47 | 7.10 | 7.40 |
| | ω | 39.52 | 39.40 | 37.41 | 38.55 | 36.73 |
| Conditional expression (1) | |fd/f2d| | 2.64 | 2.69 | 2.51 | 2.13 | 2.35 |
| Conditional expression (2) | |fd/f3d| | 1.38 | 1.41 | 1.28 | 0.99 | 1.20 |
| Conditional expression (3) | (r201 + r202)/(r201 − r202) | −1.48 | −1.48 | −1.54 | −1.91 | −1.63 |
| Conditional expression (4) | (r301 + r302)/(r301 − r302) | −1.10 | −1.15 | −1.27 | −1.52 | −1.40 |
| Conditional expression (5) | 2ωd | 79.04 | 78.79 | 74.81 | 77.10 | 73.47 |
| Conditional expression (6) | T/fd | 1.71 | 1.70 | 1.64 | 1.63 | 1.63 |
| Conditional expression (7) | |fd/f1d| | 1.91 | 1.91 | 1.92 | 1.95 | 1.88 |
| Conditional expression (8) | (r101 + r102)/(r101 − r102) | 0.79 | 0.79 | 0.74 | 0.63 | 0.70 |
| Conditional expression (9) | |fd × (Nd2 − 1)/r201| | 3.62 | 3.69 | 3.53 | 3.85 | 3.57 |
| Conditional expression (10) | V2d | 30.90 | 30.90 | 30.90 | 30.90 | 30.90 |
| Conditional expression (11) | V3d | 55.80 | 55.80 | 55.80 | 55.80 | 55.80 |
| Conditional expression (12) | V1d | 57.50 | 57.50 | 57.50 | 57.50 | 57.50 |

Note that, although FIGS. 2, 4, 6, 8, and 10 show imaging lenses, it is possible to include therein the first optical cut member 161, the second optical cut member 162, and the third optical cut member 163, as in the embodiment shown in FIG. 1, whereby an imaging unit can be configured.

Figure 12:
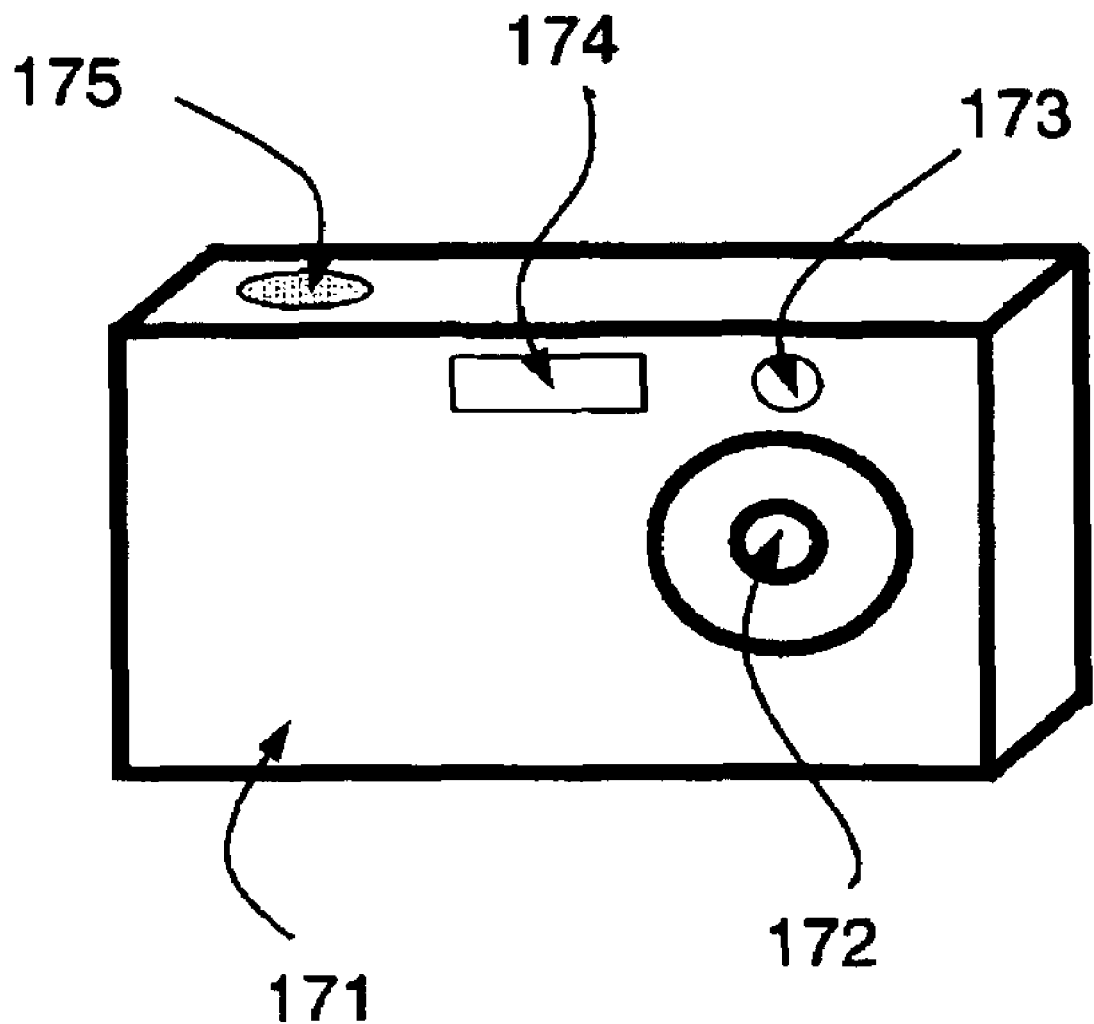
FIG. 12 is a schematic diagrammatic perspective view of an optical device showing an embodiment of the present invention.

With reference to FIG. 12, there is described an embodiment for an optical device provided with the imaging lens or the imaging unit according to the above embodiments and numerical examples.

In FIG. 12, 171 denotes a body of the optical device, such as a digital camera, provided with the imaging lens or the imaging unit of the present invention, 172 denotes the imaging lens or the imaging unit, 173 denotes an optical finder separately incorporated in the body of the optical device, 174 denotes a strobe light, and 175 denotes a release button.

By providing the imaging unit or the imaging lens of the present invention with an optical device such as a digital camera, as above, a compact optical device with high optical performance can be achieved.

INDUSTRIAL APPLICABILITY

The present invention is effective in providing an imaging lens having a small number of lenses and with high optical performance, an imaging unit, and an optical device such as a digital camera which is compact and of high optical performance, by having the lens and the unit therein.

The invention claimed is:

1. An imaging lens system for forming an optical image of an object on a light receiving surface of a solid-state image sensor, comprising, in order from an object side:
   an aperture diaphragm;
   a first lens element having a positive optical power and a convex surface on an image side;
   a second lens element having a negative optical power and being a meniscus lens whose object side has a concave shape; and
   a third lens element having a positive optical power and being a meniscus lens whose object side has a convex shape, wherein
   following conditional expressions are satisfied:

$1.9 < |fd/f2d| < 3.5$ $0.9 < |fd/f3d| < 2.0$ $-2.5 < (r_{201} + r_{202})/(r_{201} - r_{202}) < -1.4$ $-1.7 < (r_{301} + r_{302})/(r_{301} - r_{302}) < -1.0$ wherein,
   fd is a focal length of an entire lens system to a d-line in mm,
   f2d is a focal length of the second lens element to the d-line in mm,
   f3d is a focal length of the third lens element to the d-line in mm,
   $r_{201}$ is a radius of curvature of an object side surface of the second lens element in mm,
   $r_{202}$ is a radius of curvature of an image side surface of the second lens element in mm,
   $r_{301}$ is a radius of curvature of an object side surface of the third lens element in mm, and
   $r_{302}$ is a radius of curvature of an image side surface of the third lens element in mm.

2. The imaging lens system according to claim 1, wherein at least one of the first lens element, the second lens element and the third lens element has aspherical surfaces on both faces.

3. The imaging lens system according to claim 1, wherein following conditional expressions are satisfied:

$70 < 2\omega d < 85$ $1.4 < T/fd < 2.0$ wherein,
   ωd is a half view angle of the entire lens system to the d-line in degrees, and
   T is an entire length between an object side surface of the first lens element and an image plane in mm.

4. The imaging lens system according to claim 1, wherein following conditional expressions are satisfied:

$1.8 < |fd/f1d| < 2.2$ $0.5 < (r_{101} + r_{102})/(r_{101} - r_{102}) < 1.0$ wherein,
   f1d is a focal length of the first lens element to the d-line in mm,
   $r_{101}$ is a radius of curvature of the object side surface of the first lens element in mm, and
   $r_{102}$ is a radius of curvature of an image side surface of the first lens element in mm.

5. The imaging lens system according to claim 1, wherein a following conditional expression is satisfied:

$3.3 < |fd \times (Nd2-1)/r_{201}| < 4.5$ wherein,
   Nd2 is a refractive index of the second lens element to the d-line.

6. The imaging lens system according to claim 1, wherein the second lens element and the third lens element are formed from a synthetic resin material, and satisfy following conditional expressions:

$25 < V2d < 35$ $50 < V3d < 60$ wherein,
   V2d is an Abbe number of the second lens element, and
   V3d is an Abbe number of the third lens element.

7. The imaging lens system according to claim 1, wherein the first lens element is formed by a glass material, and satisfy a following conditional expression:

$50 < V1d < 65$ wherein,
   V1d is an Abbe number of the first lens element.

8. An imaging unit operable to convert an optical image of an object to an electrical image signal for output, comprising:
   an imaging lens system for forming the optical image of the object; and
   a solid-state image sensor for receiving the image formed by the imaging lens system, and converting the image to the electrical image signal, wherein
   the imaging lens system is an imaging lens system according to claim 1.

9. The imaging unit according to claim 8, wherein an optical low-pass filter is provided on an object side with respect to the solid-state image sensor.

* * * * *